June 17, 1958  B. A. KINDRED  2,839,054
RAPID DECOMPRESSION RELIEF VALVE
Filed Dec. 7, 1956  2 Sheets-Sheet 1
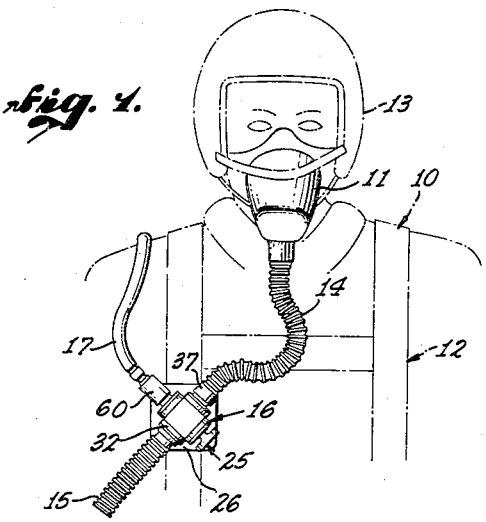
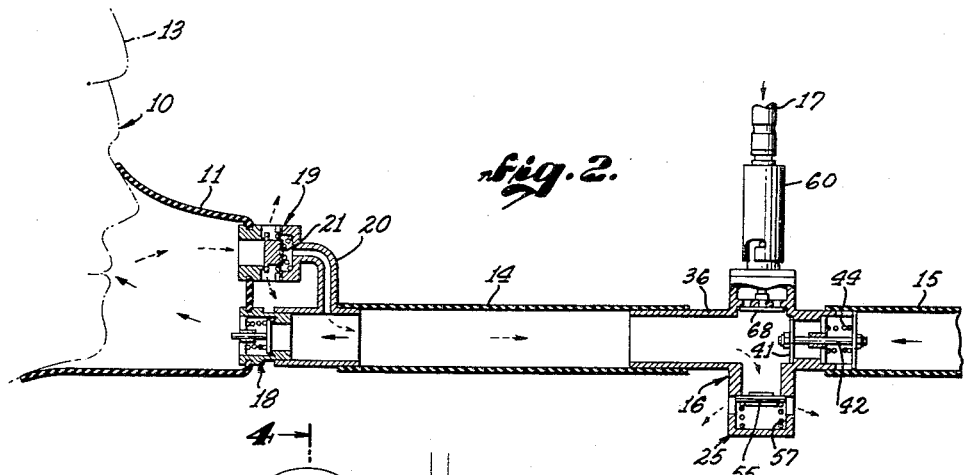
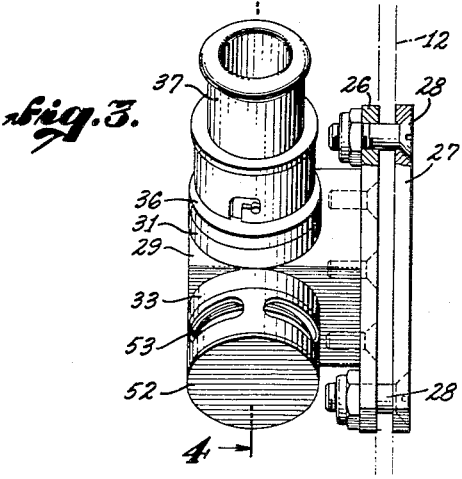
BOB A. KINDRED,
INVENTOR.
HUEBNER, BEEHLER,
WORREL & HERZIG,
ATTORNEYS.

June 17, 1958
B. A. KINDRED
2,839,054
RAPID DECOMPRESSION RELIEF VALVE
Filed Dec. 7, 1956
2 Sheets-Sheet 2
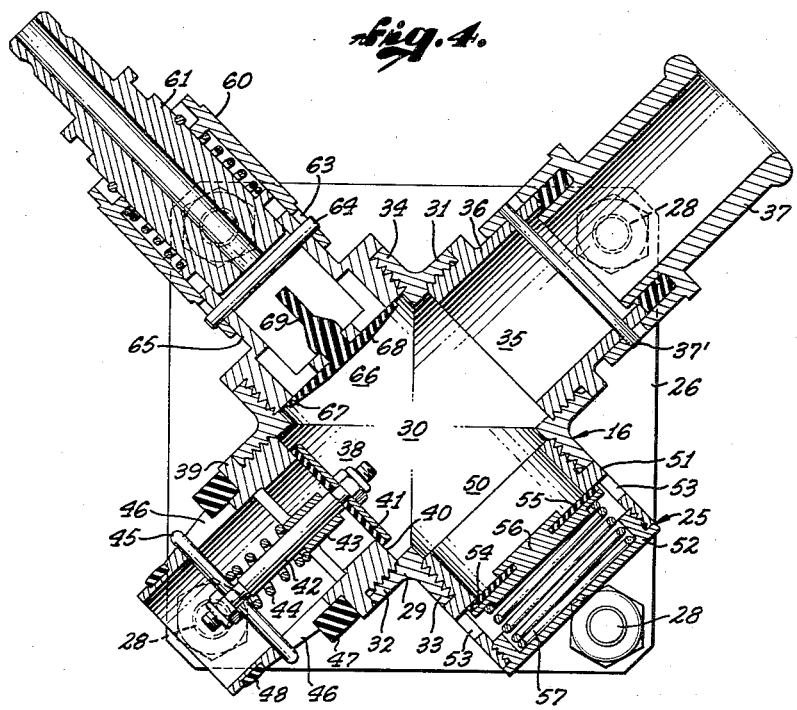
BOB A. KINDRED,
INVENTOR.
HUEBNER, BEEHLER,
WORREL & HERZIG,
ATTORNEYS.

United States Patent Office 2,839,054
Patented June 17, 1958

2,839,054
RAPID DECOMPRESSION RELIEF VALVE

Bob A. Kindred, Duarte, Calif., assignor to Sierra Engineering Co., Sierra Madre, Calif., a corporation of California Application December 7, 1956, Serial No. 626,894

8 Claims. (Cl. 128—142)

The invention relates to high altitude breathing apparatus and has particular reference to a valve system interconnecting both a main source of oxygen supply and an auxiliary source of oxygen supply, such as might be carried on the pilot's back, in such manner that should there be a sudden reduction in the cabin pressure, the pilot will be enabled to exhale freely.

The aircraft of today, in particular military aircraft, fly at altitudes where the atmospheric pressure is not sufficient for a man to survive unless he breathes oxygen which is supplied to him under pressure and which permits a high enough pressure on the cells of the lungs to permit absorption of the oxygen into the blood. At extreme altitudes, this process of pressure breathing is accompanied by considerable hazard and personal discomfort to the pilot. It is customary, therefore, to maintain a pressure in the cabin which is greater than atmospheric pressure by as much as seven to ten pounds per square inch. With this greater cabin pressure, it is normal for the pilot to wear an oxygen breathing mask and to breathe oxygen under a slightly greater pressure than that of the cabin. Situations occasionally occur where the cabin pressure is suddenly lost, as for example the dislodgment of a pilot's canopy, or the necessity for suddenly bailing out of the aircraft at high altitude.

In the event of a sudden loss of cabin pressure, the pilot experiences a high pressure differential across the walls of the chest. If the gases in the lungs are trapped so that they cannot be exhaled freely, the pilot may not survive. The normal path for the exhalation of the lung gases is through an exhalation valve mounted in the oxygen breathing mask worn by the pilot.

At the time of the loss of the cabin pressure, the oxygen supply hose to the pilot is filled with oxygen. This gas also wants to expand with the drop in cabin pressure. As this latter gas expands, it applies pressure to the exhalation valve in such a fashion as to seriously impede the exhalation of the gases from the pilot's lungs. Exhalation by the pilot therefore can be expedited if a suitable relief valve is placed in the oxygen supply hose.

It is therefore among the objects of the invention to provide a new and improved rapid decompression relief system which enables a pilot to immediately exhale through the regular breathing apparatus should there be a sudden change in pressure conditions within the cabin occupied by the pilot.

Another object of the invention is to provide a new and improved decompression relief system for use in pressurized airplane cabins whereby virtually all of the oxygen contained within the apparatus remote from the pilot's oro-nasal mask can be exhausted so as to enable reconditioning of the oxygen lines in the system preparatory to operation at a new pressure level and in a sufficiently short space of time so that the efficiency of the pilot will not be impaired.

Still another object of the invention is to provide a new and improved rapid decompression valve group which is compact in arrangement and rugged in design and which includes an outflow relief check valve so related to inflow supply check valves for both the main supply and an auxiliary supply of oxygen that the check valve when called upon will immediately permit exhausting the high pressure in the system, thereby to ready the system for a lower pressure level.

Still further among the objects of the invention is to provide a new and improved decompression relief valve group compactly and conveniently grouped so as to substantially minimize the volume of passages subject to pressure conditions which might need to be quickly altered and which is so constructed that a direct positive flow of gases under pressure is assured under all conditions.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a front elevational view of a pilot equipped with the rapid decompression relief system, parts of which are illustrated in locations normally occupied during use.

Figure 2 is a longitudinal sectional view of the valve system wherein the valves are shown in the relationship experienced under operating conditions.

Figure 3 is a side elevational view of the decompression valve group.

Figure 4 is a cross-sectional view of the decompression valve group taken on the line 4—4 of Figure 3.

In an embodiment of the invention chosen for the purpose of illustration a pilot 10 is shown in the position normally assumed when in the pressurized cabin of an airplane (not shown), the pilot being further illustrated as provided with an oro-nasal mask 11, parachute harness 12, and a helmet 13. The oro-nasal mask has a mask oxygen supply line 14 connected to it, this mask supply line being supplied from a main supply line 15 from a main source of supply (not shown) through a decompression relief valve group 16. An auxiliary oxygen supply line 17 of the customary sort is adapted to attach to some auxiliary oxygen container (not shown) which may be carried by the pilot himself and which is normally inactivated while oxygen is being breathed from the main source of supply.

At the oro-nasal mask 11 where the main supply line 14 is joined to the mask there is an inflow check valve 18 which may be designated as a breathing check valve. This check valve is lightly spring loaded and opens in response to inhalation by the pilot.

As is customary in oro-nasal masks of this general character there is provided an outflow check valve 19 which opens in response to exhalation pressure by the pilot, at which time the inflow check valve 18 is closed. For the most effective functioning of the outflow or exhalation check valve there is provided a pressure compensating line 20 which connects between the main supply line 14 at whatever the pressure may be in that line and the outflow check valve 19 at a location on the downstream side of a valve element 21 therein. The pressure compensating line maintains a back pressure on the outflow check valve equal to the pressure in the breathing system regardless of surrounding cabin pressure so that minor changes in the cabin pressure will not affect the regularity and effectiveness of the breathing system.

To understand the decompression relief system it should be appreciated that should there be a great and, as frequently happens, a sudden change in the cabin pressure from a relatively high pressure to a relatively low pressure, the gases to be exhaled by the pilot cannot easily and quickly pass through the outflow check valve 19 because of the high back pressure on the valve element 21. Ordinarily continued rebreathing will not be possible because the pilot will be unable to exhaust air from his lungs and thus make way for inhalation of oxygen supply. It therefore becomes necessary to supply a means for relieving high pressure in the mask supply line 14 and attendant lines, more particularly the pressure compensating line 20, so that the outflow check valve 19 may be unseated.

In the system herein disclosed relief of pressure is accomplished by operation of an outflow relief valve or vent valve 25 in the valve group 16.

The decompression relief valve group 16 of which the relief valve 25 is a part comprises a base plate 26 here shown as a flat plate element adapted to be secured to the parachute harness 12 by employment of a rear plate 27 and screws 28. On the base plate is a valve body 29 within which is a main valve chamber 30. The valve body 29 is formed with a series of bosses or projections 31, 32, 33 and 34, projections 31 and 32 being opposite each other in alignment and projections 33 and 34 being aligned transverse to the first identified projections and opposite each other. The boss or projection 31 may be considered as providing a free-flowing breathing passage 35 communicating through a fitting 36 with a nipple 37 to which the mask supply line 14 is attached. A sealed bayonet joint 37' may be used as a connection.

The boss 32 may be considered as providing a supply passage 38, this supply passage being adapted to communicate by means of a fitting 39 with the main supply line 15 from the source of supply.

The fitting 39 provides a valve seat 40 on which a valve element 41 is adapted to seat. The valve element is provided with a valve stem 42 slidably mounted in a spider 43. A light spring 44 acting between the spider 43 and a pin 45 on the valve stem 42 normally acts to hold the valve element 41 in seated or closed position.

In accordance with accepted practice in connections of this kind the fitting 39 is provided with apertures 46 and the pin 45 extending through the apertures is adapted to be engaged by the inside wall of the main supply line 15. The pin and valve stem are moved against pressure of the spring 44 to a permanent open position as long as the main supply line 15 remains attached to the valve group. Suitable sealing rings 47 and 48 assist in the making of a tight connection between the main supply line 15 and the valve group. The fitting 39 is adapted to be threaded into position so that it can be removed for servicing and adjustment.

The relief valve indicated generally by the reference character 25 is located in a relief passage 50 in the boss 33. A fitting 51 is threadedly mounted in the boss 33 and is provided at its outer end with a cap 52 threadedly secured at the outer end of the fitting. Exhaust vents 53 provide an outflow passage for air emerging from the chamber 30 through the relief passage 50.

Within the fitting 51 is a valve seat 54 upon which a valve element 55 normally rests. The valve element includes a stiffening disc 56 and a spring 57 acting between the cap 52 and the stiffening disc normally holds the valve closed in a seated position. In practice the spring 57 is made to exert a pressure of approximately one pound per square inch, that pressure being effective in the proper functioning of the valve group and decompression relief system.

The auxiliary supply line 17 previously made reference to terminates in a bayonet connection 60 being secured thereto by a nipple 61. A spring 62 serves to hold a bayonet joint 63 in engagement with a pin 64 when the connection is complete.

The pin in turn is mounted on a fitting 65 screw threaded in the boss 34. In this instance the boss 34 provides an auxiliary supply passage 66 which communicates with the auxiliary supply line 17. The fitting 65 provides a valve seat 67 upon which is mounted a resilient valve element 68 secured in position by a stem 69.

In describing the operation of the system let it be assumed that the cabin in which the pilot is located is pressurized for an altitude of twenty thousand feet and that the airplane is flying at an altitude of fifty thousand feet. Under such circumstances the main supply line will be also pressurized at a pressure equal to the cabin pressure of twenty thousand feet equivalent. Obviously the pilot himself will be subject to the pressure of an altitude of twenty thousand feet. As the pilot breathes the force of inhalation will draw oxygen from the main supply line through the check valve 41 which is secured in open position and through the inflow check valve 18. At this stage the auxiliary supply line 17 will be inactive. When the pilot exhales the inflow check valve 18 will close and the outflow check valve will be opened permitting the pilot to exhale through that valve into the cabin. As previously described the pressure compensating line 20 will provide a back pressure on the outflow check valve 19 equal to the pressure in the system.

Should the canopy of the airplane be blown off thereby to immediately reduce the cabin to a pressure equal to fifty thousand feet, a very much lower exterior pressure will prevail but the pilot's lungs in the meantime will be pressurized to the higher pressure equal to twenty thousand feet of elevation. It is imperative at this point that the pilot be capable of exhaling. Under the pressure differential suggested and where the relief valve 25 is held with a pressure of one pound per square inch by action of the spring 57, this valve will unseat because the difference in pressure between the interior of the valve group within the chamber 30 and the new cabin pressure equal to fifty thousand feet altitude will be greater than one pound per square inch. Hence, the interior of the system will have its pressure reduced to outside pressure. The pressure compensating line 20 will also experience outside pressure, thereby to be capable of relieving back pressure on the outflow check valve 19 and permit the pilot to immediately exhale.

Under the circumstances described it frequently happens that the pilot must discontinue use of the main source of oxygen supply. The main source might, for example, be damaged or it might be necessary for the pilot to bail out. In either event the main supply line 15 from the source of supply is readily pulled loose from the fitting 39 and this by disengagement of the supply line from the pin 45 enables the spring 44 to close the valve element 41. At this point the pilot is prompted to activate the auxiliary supply line 17 and when this occurs the pilot by normal inhalation will cause the resilient valve element 68 to unseat and permit passage of auxiliary supply oxygen through the valve group and valve chamber 30, thence past the inflow check valve 18 to the oro-nasal mask. Again the action of the relief valve 25 will permit equalizing the pressure within the system now supplied by the auxiliary oxygen supply and the surrounding atmosphere at an elevation of approximately fifty thousand feet. The equalization will apply effectively whether the pilot remains in the depressurized cabin or bails out, disconnected from the main source of supply. Whatever may be the cause of depressurizing the cabin, the relief or vent valve functions the same where differential pressures are great enough to effect opening of the relief valve, which opening is set for moderately tolerable conditions of breathing experienced by the pilot.

There has accordingly been described herein a decompression system of an improved sort rugged, compact and effective instantaneously so that under extraordinary conditions an immediate switch can be made from one source of oxygen supply to another with a minimum of discomfort and peril to the pilot.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A pilot's rapid decompression valve group for use in pressurized cabins comprising a valve body having a central chamber and four valve passages extending outwardly from said chamber, one of said passages comprising a main supply passage, a passage opposite said main supply passage comprising a free flowing breathing passage, a spring loaded inflow check valve in said main supply passage, and means on said check valve adapted upon engagement with a main supply line to hold said valve normally open when said main supply line is connected, another of said passages comprising a relief passage and a spring loaded check valve in said relief passage normally closed under a pressure of substantially one pound per square inch and adapted to open in response to exhalation in said breathing line upon a reduction in pressure exterior to said chamber, a fourth passage comprising a normally non-activated auxiliary supply, and a resilient inflow check valve element in said auxiliary supply passage adapted to open in response to inhalation in said breathing line when said main supply passage is closed.

2. In a pilot's rapid decompression valve group for use in pressurized cabins, a valve body having a central chamber and four valve passages extending radially outwardly from said chamber, one of said passages comprising a main supply passage releasably connected to said main supply line, a second passage comprising a free flowing breathing passage, a spring loaded inflow check valve in said main supply passage, aperture means at the side of said main supply passage and operating means on said check valve extending through said aperture means into engagement with the main supply line and adapted to hold said valve normally open when said main supply line is connected, a third passage comprising a relief passage and a spring loaded check valve in said relief passage normally closed under a pressure of substantially one pound per square inch and adapted to open in response to exhalation in said breathing line upon a reduction in pressure exterior to said chamber, and a fourth passage comprising a normally non-activated auxiliary supply passage, and a resilient inflow check valve element in said auxiliary supply passage adapted to open in response to inhalation in said breathing line when said main supply passage is closed.

3. A pilot's rapid decompression valve group for use in pressurized cabins contemporaneously with a stationary main oxygen supply line and a pilot carried auxiliary oxygen supply line, said group comprising a base plate adapted for attachment to a pilot harness, a valve body on said plate having a central chamber and four valve passages extending radially outwardly from said chamber, said passages having axes thereof at right angular intervals with respect to each other, one of said passages comprising a main supply passage releasably connected to said main supply line, the passage diametrically opposite said main supply passage comprising a free flowing breathing passage, a spring loaded inflow check valve in said main supply passage, apertures at the sides of said main supply passage and means on said check valve extending through said apertures into engagement with the main supply line adapted to hold said valve normally open when said main supply line is connected, one of said passages intermediate said first identified passages comprising a relief passage and a spring loaded check valve in said relief passage normally closed under a pressure of substantially one pound per square inch and adapted to open in response to exhalation in said breathing passage upon a reduction in pressure exterior to said chamber, the passage diametrically opposite said vent passage comprising a normally non-activated auxiliary supply passage, an auxiliary supply line having a connection secured to said auxiliary supply passage, and a resilient inflow check valve element in said auxiliary supply passage adapted to open in response to inhalation in said breathing line when said main supply passage is closed.

4. A pilot's rapid decompression relief system for use in airplane cabins held at pressure equivalent to an altitude less than flight altitude comprising an oro-nasal mask, a mask supply line, a main source of oxygen supply at substantially cabin pressure, a main supply line therefrom, an inflow check valve in the mask supply line, an outflow check valve at the mask and a pressure compensating line between the main supply line and the downstream side of said outflow check valve, and a rapid decompression valve group comprising a valve body having a chamber therein, a main supply passage and a main supply line therefrom adapted to be connected to said main supply, a free flowing main supply passage from said chamber to the mask supply line to said mask, a relief passage from said chamber to the exterior and a spring loaded outflow check valve in said relief passage normally closed under a pressure of substantially one pound per square inch.

5. A pilot's rapid decompression relief system for use in airplane cabins held at pressure equivalent to an altitude less than flight altitude comprising an oro-nasal mask, a mask supply line, a main source of oxygen supply at substantially cabin pressure, an auxiliary source of oxygen supply, an inflow check valve in the main supply line, an outflow check valve from the mask and a pressure compensating line between the main supply line and the downstream side of said outflow check valve, and a rapid decompression valve group comprising a valve body having a chamber therein, a main supply passage and a main supply line therefrom adapted to be connected to said main supply, an inflow check valve in said passage normally open when said main supply line is connected and adapted to be released upon disconnection of said main supply line, a free flowing main supply passage from said chamber to the mask supply line, a relief passage from said chamber to the exterior and an outflow check valve in said relief passage normally closed under a pressure of substantially one pound per square inch, an auxiliary supply passage, a normally closed auxiliary supply line connected thereto and an inflow check valve in said auxiliary passage operable when the main supply line is disconnected and the auxiliary supply line is activated.

6. A pilot's rapid decompression relief system for use in airplane cabins held at pressure equivalent to an altitude less than flight altitude comprising an oro-nasal mask, a mask supply line, a main source of oxygen supply at substantially cabin pressure, an auxiliary source of oxygen supply attached to the pilot subject to pressure of flight altitude, an inflow check valve in the mask supply line at the mask, an outflow check valve at the mask and a pressure compensating line between the mask supply line and the downstream side of said outflow check valve, and a rapid decompression valve group comprising a valve body having a chamber therein, a main supply passage and a main supply line therefrom adapted to be connected to said main source of oxygen supply, a spring loaded inflow check valve in said passage normally open when said main supply line is connected and adapted to be released to closed position upon disconnection of said main supply line, a free flowing mask supply passage from said chamber to the mask supply line, a relief passage from said chamber to the exterior and a spring loaded outflow check valve in said relief passage normally closed under a pressure of substantially one pound per square inch, an auxiliary supply passage, a normally closed auxiliary supply line connected thereto and an inflow check valve in said auxiliary passage operable when the main supply line is disconnected and the auxiliary supply line is activated.

7. A pilot's rapid decompression valve group for use in pressurized cabins comprising a valve body having a central chamber and four valve passages in communication with said chamber, one of said passages comprising a main supply passage, a second passage comprising a free flowing breathing passage, an inflow check valve in said main supply passage including resilient means normally closing said check valve, and means on said check valve adapted upon engagement with a main supply line to hold said valve normally open when said main supply line is connected, another of said passages comprising a relief passage and a check valve in said relief passage including resilient means closing said last valve under a pressure of substantially one pound per square inch, said valve being adapted to open in response to exhalation in said breathing line upon a reduction in pressure exterior to said chamber, a fourth passage comprising a normally non-activated auxiliary supply, and a low resistance inflow check valve element in said auxiliary supply passage adapted to open in response to inhalation in said breathing line when said main supply passage is closed.

8. A pilot's rapid decompression valve group for use in pressurized cabins comprising a valve body having a central chamber and a plurality of valve passages in communication with the chamber, one of said passages comprising a supply passage, a second passage comprising a free flowing breathing passage having a flow capacity exceeding the capacity of said supply passage, an inflow check valve in said supply passage including resilient means normally closing said check valve, and means on said check valve adapted upon engagement with a main supply line to hold said valve normally open when said main supply line is connected, another of said passages comprising a relief passage having a capacity equivalent to the capacity of said breathing passage, an outflow check valve in said relief passage including means normally closing said last valve under a pressure of substantially one pound per square inch, said valve being adapted to open in response to exhalation in said breathing line upon a reduction in pressure exterior to said chamber.

References Cited in the file of this patent

UNITED STATES PATENTS

| 2,473,518 | Garrard | June 21, 1949 |
| 2,711,169 | Hull et al. | June 21, 1955 |